United States Patent [19]

Cole

[11] 4,285,539
[45] Aug. 25, 1981

[54] RETRACTABLE TONNEAU TOP

[76] Inventor: Richard C. Cole, 627 E. 16th St., Sedalia, Mo. 65301

[21] Appl. No.: 18,949

[22] Filed: Mar. 9, 1979

[51] Int. Cl.$^3$ .............................................. B60J 7/06
[52] U.S. Cl. .................................... 296/105; 296/100
[58] Field of Search ................ 296/105, 104, 100, 101

[56] References Cited

U.S. PATENT DOCUMENTS

| | | | |
|---|---|---|---|
| 2,469,958 | 5/1949 | Fowler | 296/105 |
| 2,610,086 | 9/1952 | Shield | 296/105 |
| 3,310,338 | 3/1967 | Greenberg | 296/105 X |
| 3,326,598 | 6/1967 | Kunsch | 296/105 |
| 3,481,645 | 12/1969 | Stepp | 296/105 |
| 3,500,895 | 3/1970 | Silverrail | 296/105 X |

*Primary Examiner*—Joseph F. Peters, Jr.
*Assistant Examiner*—Norman L. Stack, Jr.
*Attorney, Agent, or Firm*—Lowe, Kokjer, Kircher, Wharton & Bowman

[57] ABSTRACT

This invention deals with a retractable tonneau top which is suitable for use on the open-bed of a truck, trailer or wagon. This tonneau top comprises a piece of covering material which is carried by a stationary bow structure, a movable bow structure and a plurality of intermediate bow structures which are located between the stationary and movable bow structures. The movable and intermediate bow structures laterally move along a pair of tracks which are attached to the opposing side walls of the open-bed. Movement of the top is controlled by means of a crank. Rotational movement of this crank is simultaneously imparted to a drive chain associated with each track. Each of these drive chains is in turn coupled with the movable bow structure such that the movable bow structure is capable of moving in combination therewith. Movement of the drive chains in one direction causes the tonneau top to move from a retracted position to an extended position while movement of the drive chains in the opposite direction causes the top to move from the extended position to the retracted position.

4 Claims, 7 Drawing Figures

U.S. Patent   Aug. 25, 1981   Sheet 1 of 2   4,285,539
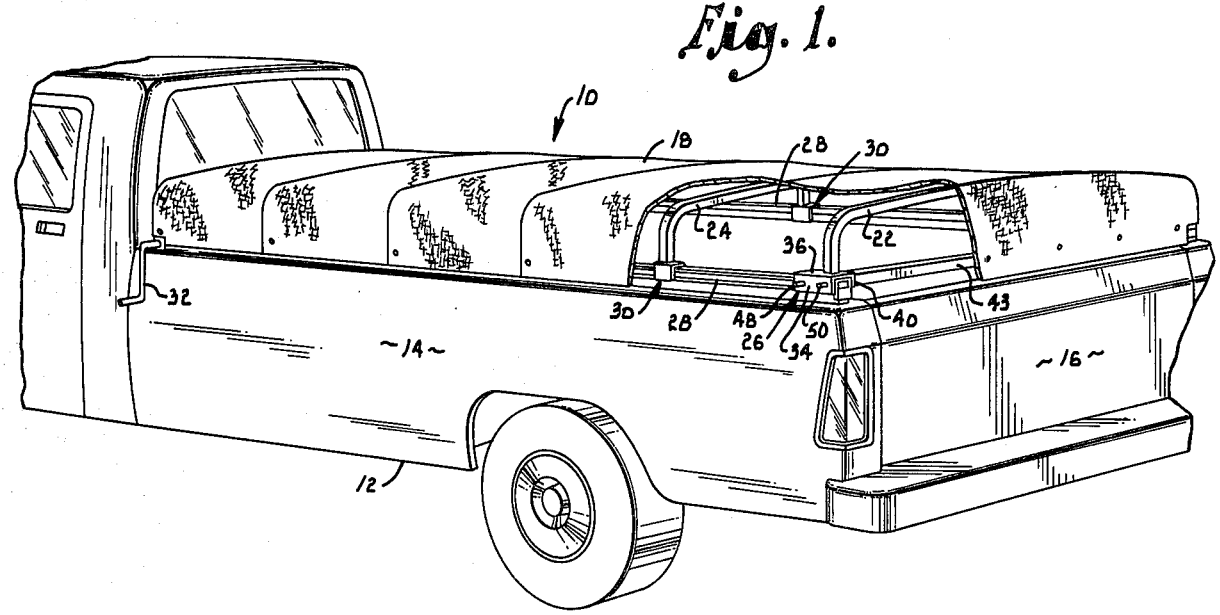
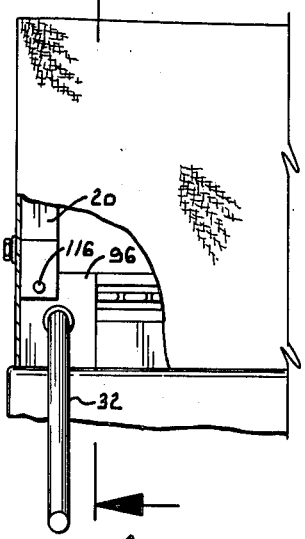
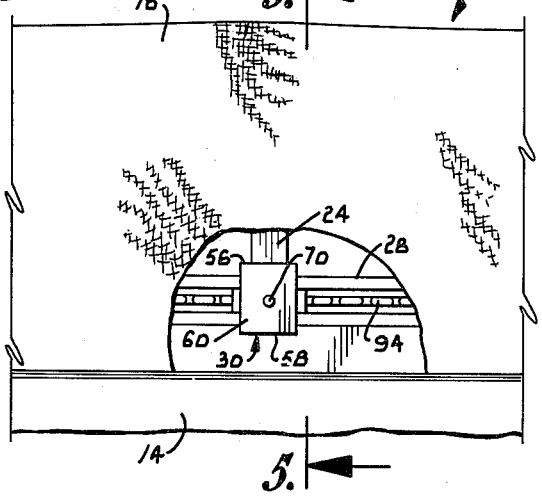
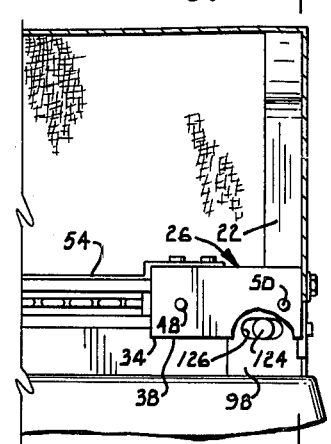
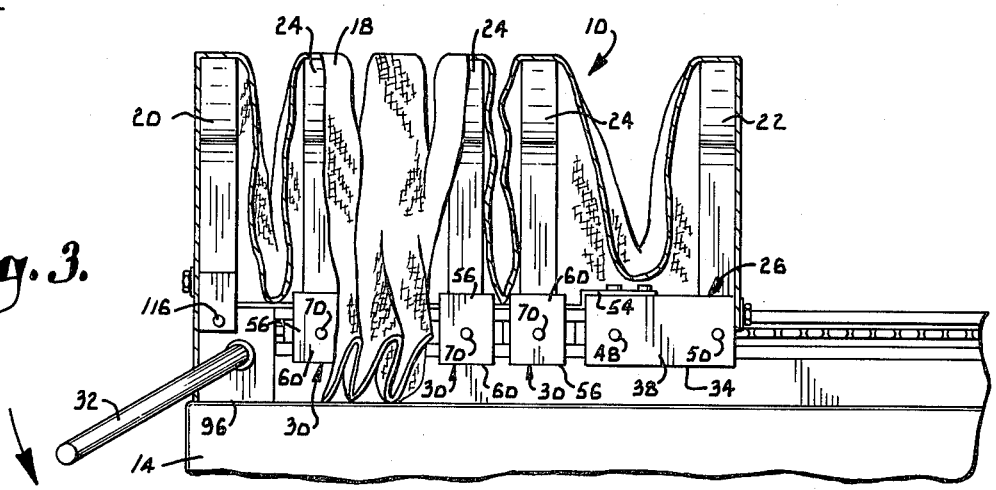

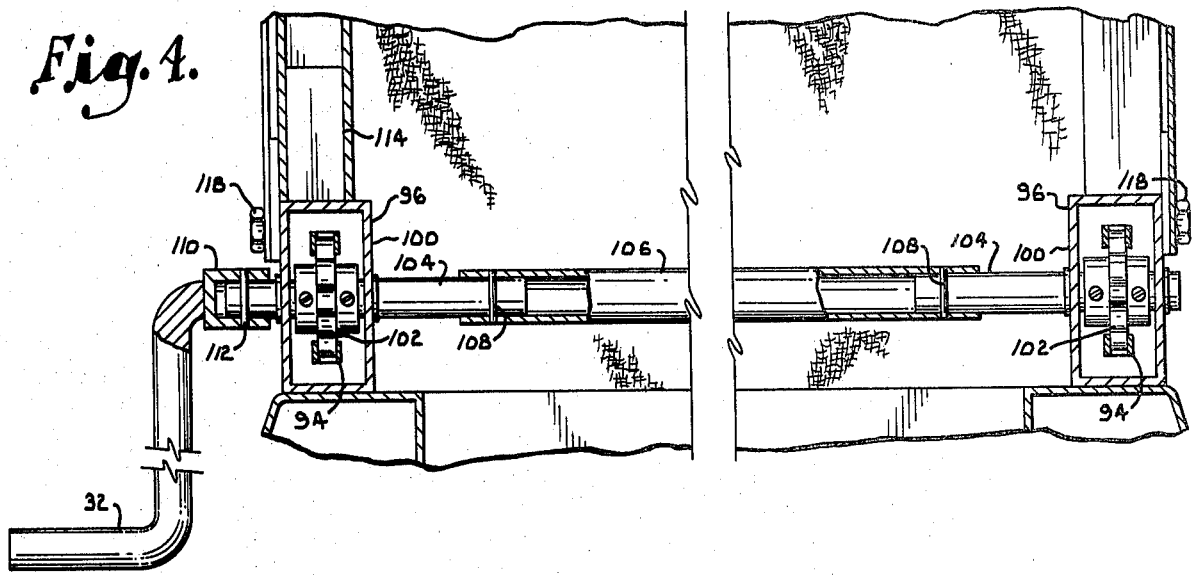
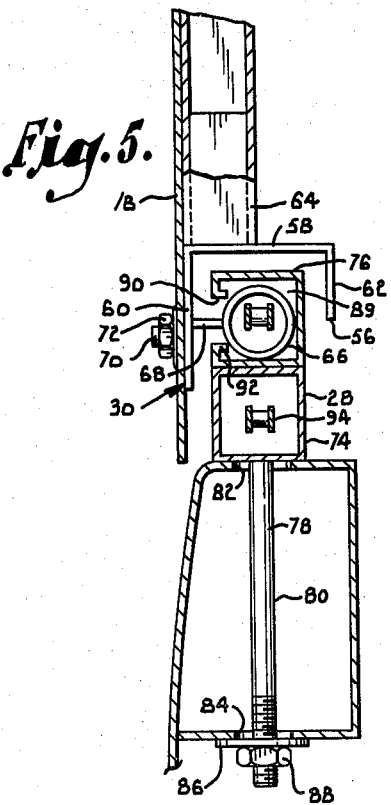
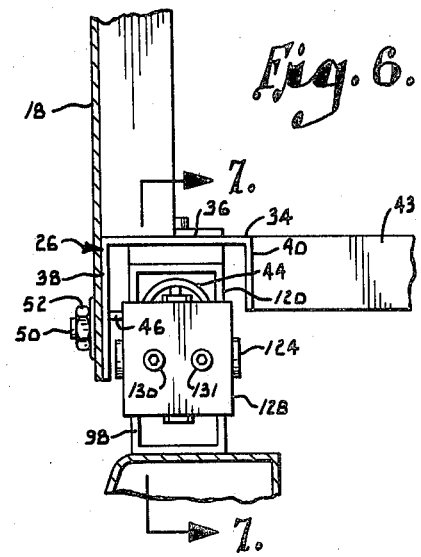
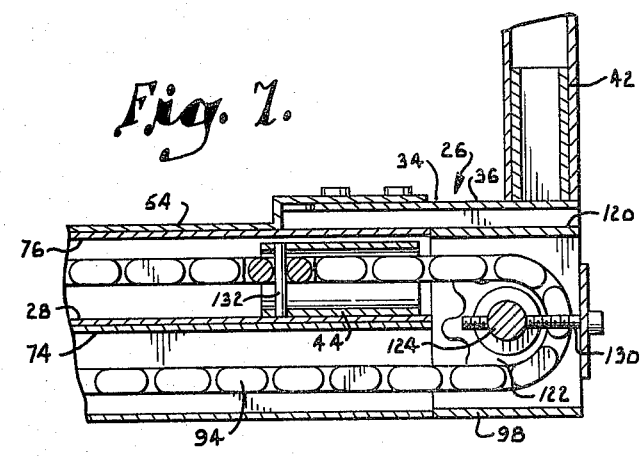

RETRACTABLE TONNEAU TOP

BACKGROUND AND BRIEF DESCRIPTION OF THE INVENTION

This invention relates in general to a retractable tonneau top which is suitable for use on open bed-trucks, trailers and wagons.

The contents of an open-bed truck, trailer or wagon are exposed to the elements. It often becomes necessary to cover the contents of an open-bed truck, trailer or wagon from the elements to protect them from weather damage. Several types of coverings have been developed for this purpose. The most common type of covering comprises a piece of canvas or a tarpaulin which is thrown over the open bed of the truck, trailer or wagon and then secured in place by means of a rope or some other type of fastening means. Another type of covering which is often used to cover the open bed of a truck, trailer or wagon consists of a rigid structure having outer side walls and a roof which is carried by the side walls. The side walls are made to conform to the sides of the open bed on which the structure is to be used. This type of covering is put into use on the open bed of the truck, trailer or wagon by positioning the covering on the open bed and then securing it in place by means of nut and bolt assemblies or some other suitable means.

Both of these types of coverings, however, are unsatisfactory in several respects. In particular, these prior art coverings are extremely difficult to use. For example, a canvas type of covering must be spread out over the bed and then secured in place by tieing the covering down or fastening each clasp used to secure the piece of canvas to the bed. As a result, this type of covering is difficult and time consuming to install.

Rigid coverings are also difficult to install because of their bulky nature. In addition, this type of covering is particularly difficult to store since it requires a large amount of space. Another disadvantage of the rigid type of covering is that the covering cannot be conveniently transported with the vehicle on which it is to be used. The covering must be kept at a storage location and the vehicle must be taken to that location for installation of the covering.

It is therefore an object of the present invention to provide a retractable tonneau top which is capable of being permanently mounted on the open bed of a truck, trailer or wagon and of being removed from a retracted position to an extended position with minimal effort.

Another object of the present invention is to provide a retractable tonneau top which utilizes a unique action to move the top from a retracted position to an extended position and vice versa.

A further object of the present invention is to provide a retractable tonneau top which is operable to properly position and space along the open bed of the truck, trailer or wagon the bow structures used to carry the top during movement of the top from the retracted to extended position.

An additional object of the present invention is to provide a retractable tonneau top which may be easily moved from the extended position to the retracted position even if one or more of the bow structures get out of line.

It is an added feature of the present invention to provide a retractable tonneau top which may be quickly and easily installed on presently existing open bed trucks, trailers and wagons.

Other and further objects of the invention, together with the features of novelty apurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 1 is a perspective view of a tonneau top constructed according to a preferred embodiment of the present invention showing the top installed on an open bed pickup truck with portions broken away for the purposes of illustration;

FIG. 2 is a side elevational view of the tonneau top shown in FIG. 1, with portions broken away for the purposes of illustration and the broken away portions indicating continuous length;

FIG. 3 is a side elevational view of the tonneau top of the present invention showing the top in a retracted position with portions broken away for the purposes of illustration;

FIG. 4 is a fragmentary sectional view taken generally along line 4—4 of FIG. 2 in the direction of the arrows, with the broken away portion indicating continuous length;

FIG. 5 is a fragmentary sectional view taken generally along line 5—5 of FIG. 2 in the direction of the arrows;

FIG. 6 is a fragmentary sectional view taken generally along line 6—6 of FIG. 2 in the direction of the arrows;

FIG. 7 is a fragmentary sectional view taken generally along line 7—7 of FIG. 6 in the direction of the arrows.

Reference is now made to FIGS. 1, 2 and 3 wherein a tonneau top 10 which is constructed in accordance with a preferred embodiment of the present invention is shown installed on an open bed truck 12. The truck shown in this figure is equipped with an open bed which is defined by a pair of lateral side walls 14 (only one side wall is shown in these figures), a back wall 16, and a front wall which is not shown in this figure. It should be noted at this time that the use of an open bed truck is merely illustrative and that the tonneau top of the present invention can be similarly installed on open-bed trailers and wagons.

As shown in these figures, the weather top of the present invention is comprised of a flexible covering material 18 which is carried by a stationary bow structure 20, a movable bow structure 22 and a plurality of intermediate bow structures 24. The covering material is typically constructed of canvas but may also be constructed of any other type of material which is water repellant and flexible in nature. Each of the bow structures is constructed of square tubing which is shaped to form a generally U-shaped piece. The bow structures are used in the shape of an inverted U and are sized and positioned so that they span the open bed of the truck in a parallel orientation. As a result, one side of each bow is positioned near each of the lateral sides of the open bed.

A drive unit 26 is attached to each of the two ends of the movable bow structure (only one of these units is shown in these figures). Each drive unit is arranged to ride along a pair of tracks 28. One of these tracks is attached to each lateral side of the open-bed. As a result, the drive unit which is attached to one end of the movable bow structure rides along one of the tracks while the drive unit which is attached to the other end of the movable bow structure rides along the other track.

Each of the intermediate bow structures has a guide unit 30 attached to each of its two ends (only one of these guide units is shown in these figures). Each guide unit like the drive units is arranged to ride along the track which is attached to its corresponding side wall. In this way, the tracks provide a path along which the movable bow structure and each of the intermediate bow structures are capable of moving in response to rotational movement of a crank 32.

Reference is now made to FIGS. 1, 2, 3, 6 and 7 for a more detailed description of drive unit 26. Each drive unit is comprised of an inverted J-shaped piece 34 which is comprised of a base plate 36, a long side plate 38 and a short side plate 40. A mounting bar 42 is suitably attached to the upper surface of the base plate of each of the two drive units to protrude outward therefrom at a right angle therewith. The mounting bar has a square cross section and is capable of tightly fitting within the inner portion of the square tubing which makes up the movable bow structure. By forcing the mounting bar into the inner portion of the movable bow structure the drive unit can be quickly and easily attached to the movable bow structure. Each drive unit also includes an aligning sleeve 44 which is fixedly secured to the inner surface of the long side plate 38 of the J-shaped piece 34 by means of a mounting member 46. Both of the drive units are coupled with each other by means of a joining bar 43. This bar is welded or otherwise attached to the short side plate 40 of each drive unit. A pair of mounting pins 48 and 50 are attached to the outer surface of the long side plate 38 to provide a place for conveniently securing the piece of covering material to the drive unit. Each of these mounting pins passes through a hole in the covering material and receives a nut such as 52 to secure the covering material to the drive unit. In addition, a slide bar 54 is welded or otherwise attached to the upper surface of base plate 36.

Referring now primarily to FIGS. 1, 2, 3 and 5, each guide unit is comprised of a inverted J-shaped piece 56 which includes a base plate 58, a long side plate 60 and a short plate 62. A mounting bar 64 is suitably attached to the upper surface of the base plate 58 of each guide unit. This mounting bar is comprised of a short piece of square stock which is capable of snugly fitting within the inner portion of its associated intermediate bow structure to thereby secure the guide unit to the bow structure. Each guide unit is also equipped with an aligning sleeve 66 which is fixedly secured to the inner surface of the long side plate 60 by means of a mounting member 68. A mounting pin 70 is attached to the outer surface of the long side plate 60 of each guide piece. This mounting pin is arranged to pass through a corresponding hole in the piece of covering material and receives a nut 72 to secure the canvas material to the guide piece.

Reference is now made to FIGS. 5 and 7 for a more detailed description of the tracks along which the guide and drive units move. One of these tracks is attached to each of the lateral side walls and both of these tracks are identical in design and construction. Each of these tracks is comprised of a support portion 74 and a guideway forming portion 76.

The support portion of the track is comprised of square tubing which is attached to its associated side wall by means of a plurality of spaced apart nuts and bolts assemblies such as 78. These nut and bolt assemblies comprise a mounting pin 80 with a threaded end portion. These mounting pins are fixedly secured to the under side of the support portion of the track to project outward therefrom. The threaded pin passes through an associated hole 82 in the top surface of the side wall and through another hole 84 in the bottom surface of the side wall. A washer 86 and locking nut 88 are received by the threaded portion of the pin which protrudes outward from the bottom surface of the side wall. As locking nut 88 is tightened, washer 86 comes in contact with the bottom surface of the side wall to secure the support position of the track to the side wall.

The guide forming piece, on the other hand, is comprised of a C-shaped piece of metal which forms a guideway 89 within its inner portion. As shown in FIG. 5, the guideway forming portion of the track encircles the aligning sleeve of the guide unit to position the aligning sleeve within the guideway formed by this portion of the track. The aligning sleeve of each drive unit is also positioned within the guideway formed by the guideway forming portion of the track. The terminating ends 90 and 92 of the guideway forming piece are turned inward to more accurately define the guideway formed by this piece.

Referring now principally to FIGS. 2, 3, 4, 5, 6 and 7, a drive chain 94 acts as the prime mover for the tonneau top. Drive chain 94 is retained in place by means of a primary actuator assembly 96 which is attached to the front end of each track and a secondary actuatory assembly 98 which is attached to the back end of each track. Each pair of primary and secondary actuators are positioned at the opposite ends of their associated tracks and carry the drive chain such that the upper run of the drive chain passes through the guideway of the guideway forming portion of the track and the lower run of the chain passes through the hollow inner portion of the support portion of the track.

The primary actuator assembly is shown in greater detail in FIG. 4. As shown in this figure, each of the primary actuator assemblies includes a square outer housing 100 having two open ends. The outer housing of each primary actuator is attached to the track such that the hollow inner portion of the housing is aligned with the guideway formed by the guideway forming portion of the track and the hollow inner portion of the support portion of the track. A drive sprocket 102 is mounted within the outer housing of each primary actuator assembly by means of a horizontal shaft 104. The horizontal shaft of both of the primary actuator assemblies are coupled with each other so that they are capable of rotating in unison. This coupling is accomplished by means of a hollow tube 106 which receives in its opposing ends a portion of each shaft. The tube is then locked to the shafts by means of a locking pin 108. Crank 32 is attached to the horizontal shaft 104 associated with one of the primary actuator assemblies to impart rotatable motion to this shaft. The crank is provided with a coupling housing 110 which fits over a portion of the shaft to which it is attached. The crank is in turn locked to this shaft by means of a locking pin 112 which is located within a hole in the coupling housing and in the shaft to which the crank is attached.

One end of the stationary bow structure is attached to each of the primary actuator assemblies by means of a mounting bar such as 114. The mounting bar is comprised of a piece of square stock which is welded or otherwise attached to the outer surface of the outer housing 100 of the actuator assembly. A mounting pin 116 is also attached to each primary actuator assembly to attach the piece of covering material thereto. This pin passes through an associated hole in the covering material and receives a nut 118 to retain the material in place on the mounting pin.

One of the secondary actuator assemblies is principally shown in FIGS. 6 and 7. As shown in these figures, each secondary actuator assembly includes a square outer housing 120 which is equipped with two open sides. This outer housing is attached to the track such that one of its open sides is aligned with the guideway in the guideway forming portion of the track and the hollow inner portion of the support portion of the track. The secondary actuator assembly is also equipped with an idler sprocket 122. The idler sprocket is carried by a horizontal shaft 124 which sits within an elongate slot 126 in the vertical sides of the housing. A mounting plate 128 is secured to the rear of the housing so that it covers a portion of the open side of the housing. This plate is provided with a pair of holes which are capable of receiving threaded pins 130 and 131. Each of these pins threadably engages an internally threaded hole in the shaft 124 on opposite sides of the idler sprocket. In this way, rotatable movement of these pins causes the shaft to move laterally within slot 126 with the direction of movement being determined by the direction in which the pins are rotated.

The drive chain 94 associated with each track is drawn around its corresponding drive sprocket 102 and idler sprocket 12 such that the upper run of the chain is positioned within the guideway produced by the guideway forming portion of the track and the lower run of the chain passes through the hollow inner portion of the support portion of the track. Once the chain is installed on the drive and idler sprockets, threaded pins 130 and 131 are simultaneously rotated to move the idler sprocket away from the drive sprocket to tighten the chain. A pin 132 sits within a pair of holes in the aligning sleeve 44 of the drive unit and passes through a link in the drive chain to couple this piece with the drive chain. As a result, the drive unit moves in combination with the upper run of the drive chain.

In operation, the crank 32 is turned to impart movement to the tonneau top. Turning of this crank causes the drive sprocket 102 associated with each of the primary actuators to rotate. In particular, crank 32 is attached directly to shaft 104 used to carry one of the drive sprockets so that movement of the crank is imparted directly to this sprocket. This shaft is also coupled with the shaft of the drive sprocket associated with the other actuator assembly by means of coupling piece 106 and locking pins 108. In this way, movement of the crank is simultaneously imparted to the drive sprocket associated with each track thereby causing these sprockets to rotate in unison.

Rotational movement of these drive sprockets in turn causes the drive chain 94 associated with each of these sprockets to be advanced according to the direction in which the drive sprocket is rotating. The drive unit attached to each end of the movable bow structure is in turn coupled with its corresponding drive chain by means of locking pin 132 such that lateral movement of the upper run of the chain causes the drive unit to move in combination with the chain. In this way, movement of the crank imparts lateral movement to the movable bow structure by means of the drive sprockets 102, the drive chain 94, and the drive units 26.

To move the tonneau top from the retracted position shown in FIG. 3 to the extended position shown in FIGS. 1 and 2, the crank is turned in a clockwise direction (as viewed in FIGS. 2 and 3) which in turn causes the drive sprockets 102 associated with each track to rotate in a clockwise direction (as viewed in FIGS. 2 and 3). Clockwise rotation of these drive sprockets causes the upper run of the chain associated with each of these sprockets to move from left to right when viewed in FIGS. 2 and 3. Coupling pin 132 causes each drive unit to move in combination with its associated drive chain. Since the movable bow structure is fixedly secured to the drive units, lateral movement of these units in turn causes the movable bow structure to move in combination therewith. As the movable bow structure moves from left to right (as viewed in FIGS. 2 and 3), the portion of the covering material which is located between the movable bow structure and the intermediate bow structure positioned directly to the left of the movable bow structure (as viewed in FIGS. 2 and 3) tightens until this portion of the covering material becomes taut.

Thereafter, continual outward movement of the drive units and movable bow structure causes the first intermediate bow structure to be pulled outward in combination with the movable bow structure. As a result, all of the bow structures do not move in unison. Movement is rather imparted to each of the intermediate bow structures in succession with lateral movement of the drive chain being imparted directly to the movable bow structure by means of the drive units attached to it and indirectly to each of the succeeding bow structures by means of the covering material located between each succeeding bow structure. In this way, the tonneau top of the present invention is capable of maintaining the proper spacing between each bow structure and of properly aligning each of the bow structures along the side of the open-bed.

To move the tonneau top from the extended position shown in FIGS. 1 and 2 to the retracted position shown in FIG. 3, crank 32 must be turned in a counter clockwise direction (as viewed in FIGS. 2 and 3). Movement of the crank in this direction causes the drive sprockets 102, associated with each track, to rotate in a like direction. Counter clockwise rotation of the drive sprockets causes the upper run of each drive chain to move from right to left (as viewed in FIGS. 2 and 3). This lateral movement of the drive chain causes the movable bow structure to begin moving from right to left (as viewed in FIGS. 2 and 3). As the movable bow structure moves in this direction, the portion of the covering material which is positioned between the movable bow structure and the first intermediate bow structure begins to slacken and falls within the area between these two bow structures. This material comes to rest on the slide bar 54 which protrudes outward from each drive unit. The slide bar provides a convenient platform on which the covering material may rest to keep this material from dragging along the track thereby significantly reducing drag friction and making movement of the top easier. Further movement of the movable bow structure causes the slide bar to pass within the space between the base plate 58 of the first intermediate bow structure and the track and the drive unit of the movable bow structure to come in contact with the guide piece of the intermediate bow structure. Thereafter, additional inward movement of the movable bow structure causes the guide unit of the first intermediate bow structure to be pushed along the drive units of movable bow structure. As the tonneau top is being moved to the retracted position, each of the bow structures is similarly engaged and moved in succession until the tonneau top is returned to the retracted position.

From the foregoing it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A retractable tonneau top for a vehicle bed having a pair of side walls, said tonneau top comprising:
    a pair of tracks mounted to the respective side walls of the vehicle bed, each track having a substantially enclosed tube underlying a substantially enclosed guideway having an opening therein;
    a plurality of sleeve members received in each guideway for movement lengthwise therein, said sleeve members being arranged in the opposed guideways in laterally aligned pairs;
    a guide unit for each sleeve member, each guide unit having a guide portion substantially surrounding the guideway and a connecting portion extending through said opening from the guide portion and connected with the corresponding sleeve member, each guide portion having a pair of side plates embracing opposite sides of the guideway and a top plate covering the top of the guideway;
    a plurality of bow members adapted to span the vehicle bed and each having opposite ends attached to the guide portions of the corresponding guide units;
    a flexible cover carried by the bow members and having sufficient size to substantially cover the vehicle bed;
    a pair of endless drive members supported for movement on the respective tracks and each having an upper run extending within the guideway of the corresponding track and a lower run extending within the tube of the corresponding track; and
    means for coupling the upper runs of the drive members with the rearmost pair of sleeve members to effect movement of the rearmost pair of sleeve members in unison with the upper runs of the drive members for extension and retraction of the flexible cover.

2. A tonneau cover as set forth in claim 1, wherein the opening of each guideway comprises an elongate slot in a side surface of the guideway.

3. A retractable tonneau top for a vehicle bed having a pair of side walls, said tonneau top comprising:
    a pair of tracks mounted to the respective side walls of the vehicle bed, each track including a guideway having an upper surface closing the top of the guideway;
    a pair of rear drive elements received in the respective guideways for movement lengthwise therein;
    a pair of drive units disposed exteriorly of the guideways and coupled with the respective rear drive elements;
    at least one pair of intermediate drive elements received in the respective guideways for movement lengthwise therein at locations forwardly of the rear drive elements;
    a pair of guide units disposed exteriorly of the guideways and coupled with the respective intermediate drive elements;
    a pair of bow members adapted to span the vehicle bed, one bow member having opposite ends coupled with said drive units and the other bow member having opposite ends coupled with said guide units;
    a flexible cover carried on the bow members and having sufficient size to substantially cover the vehicle bed, said cover having a relatively slack retracted condition when the bow members are moved toward one another and a relatively taut extended condition when the bow members are moved away from one another;
    a pair of endless drive members supported for movement on the respective tracks and each having one run extending within the guideway of the corresponding track beneath the upper surface thereof, each rear drive element being coupled with said one run of the corresponding drive member for movement therewith; and
    a slide bar carried on each drive unit and projecting therefrom generally toward the corresponding guide unit above the upper surface of the guideway at a location to receive the slack portion of said cover in a manner to prevent same from dragging on the upper surfaces of the guideway as the cover is moved between the extended and retracted conditions, thereby avoiding excessive wear of said cover and facilitating movement of the cover between the extended and retracted conditions.

4. A tonneau top as set forth in claim 3, wherein each guide unit has a top plate spaced above the corresponding upper guideway surface, each slide bar being arranged to extend between the top plates of the corresponding guide unit and the upper guideway surface as said drive units approach said guide units.

* * * * *